United States Patent
Peden et al.

(10) Patent No.: US 10,476,808 B1
(45) Date of Patent: Nov. 12, 2019

(54) DYNAMIC CONFIGURATION OF MAXIMUM TRANSMISSION UNIT OF UE, BASED ON RECEIPT OF OVERSIZED PACKET(S) AT NETWORK ENTITY

(71) Applicant: Sprint Spectrum L.P., Overland Park, KS (US)

(72) Inventors: Mark D. Peden, Olathe, KS (US); Rodney D. Nelson, Overland Park, KS (US); John E. Belser, Olathe, KS (US); Paul M. Andreas, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/914,634

(22) Filed: Mar. 7, 2018

(51) Int. Cl.
*H04L 12/28* (2006.01)
*H04L 12/805* (2013.01)
*H04W 28/06* (2009.01)
*H04W 88/06* (2009.01)
*H04L 29/06* (2006.01)

(52) U.S. Cl.
CPC .......... *H04L 47/365* (2013.01); *H04L 69/166* (2013.01); *H04W 28/06* (2013.01); *H04W 88/06* (2013.01)

(58) Field of Classification Search
CPC ..... H04L 47/365; H04L 69/166; H04W 28/06
See application file for complete search history.

(56) References Cited

U.S. PATENT DOCUMENTS

| | | | |
|---|---|---|---|
| 2008/0008183 A1* | 1/2008 | Takagaki | H04L 45/00 370/392 |
| 2011/0243063 A1 | 10/2011 | Kuningas | |
| 2015/0036511 A1 | 2/2015 | Cheng | |

OTHER PUBLICATIONS

W. Osama, "Understand MTU and MRU—The Full Story" Networkers-online.com, Mar. 1, 2016 (Year: 2016).*
W. Osama, "Understand MTU and MRU—The Full Story," Networkers-online.com, Mar. 1, 2016.
"MTU Negotiation," Cisco Support Community, printed from the World Wide Web Mar. 1, 2018.

* cited by examiner

*Primary Examiner* — Bo Hui A Zhu

(57) ABSTRACT

When a network entity receives packets transmitted from a user equipment device (UE), the network entity will detect that a threshold number of those packets exceed the network entity's maximum transmission unit (MTU), and the network entity will responsively cause the UE to reduce the UE's MTU. In particular, the network entity will responsively transmit to the UE, within a header of a packet carrying bearer data to the UE, a directive for the UE to decrease the UE's MTU.

20 Claims, 5 Drawing Sheets

PROTOCOL STACK

DYNAMIC CONFIGURATION OF MAXIMUM TRANSMISSION UNIT OF UE, BASED ON RECEIPT OF OVERSIZED PACKET(S) AT NETWORK ENTITY

BACKGROUND

In a packet-switched network, each entity that engages in transmission of packets could be configured with a maximum transmission unit (MTU), defining a maximum allowed packet length for packets transmitted by the entity. The MTU could be defined in terms of the entire datagram output by the entity, including both header and payload, or in terms of the payload alone, among other possibilities.

In accordance with its MTU, when the entity is going output a packet, the entity could determine whether the packet's length exceeds the entity's MTU, and if so, the entity could fragment the packet into multiple parts for output as separate packets. Unfortunately, however, such fragmentation is undesirable, as routing the additional packets could burden the entity and the network, and as issues could arise with reassembly of the fragments at a receiving end, which could lead to required retransmissions and other burdens.

OVERVIEW

A representative network may include various intermediary nodes, such as base stations, routers, switches, gateways, and/or firewalls, through which packets flow on their way between transmitting nodes and receiving nodes. A problem that can arise with such an arrangement, however, is that transmitting nodes and intermediary nodes may have different MTUs than each other. In particular, a transmitting node may be configured with an MTU that is larger than the intermediary node's MTU, so that packets transmitted by the transmitting node satisfy the transmitting node's MTU but exceed the intermediary node's MTU. In that situation, when the intermediary seeks to output such packets for transmission to their destinations, the intermediary node may need to fragment the packets. Yet such fragmentation could give rise to issues like those noted above.

This problem could occur, for instance, where the transmitting node and intermediary node are manufactured by different manufacturers who manufacturers do not share MTU information with each other. Further, the problem could occur where the transmitting node is a mobile device, able to operate on various different networks and in various different regions where different MTUs might be used. For example, this could happen where the transmitting node is a wirelessly equipped user equipment device (UE), and where MTU settings vary as between cellular carrier networks or between subnetworks or regions within a given carrier's network.

Disclosed is a method and system to help efficiently address this issue. In accordance with the disclosure, when a network entity receives packets transmitted from a UE, the network entity will detect that a threshold number of those packets exceed the network entity's MTU, and the network entity will then responsively cause the UE to reduce the UE's MTU setting in an effort to avoid a recurrence of the problem. In particular, the disclosure provides that when the network entity detects the threshold number such packets exceeding the network entity's MTU, the network entity will responsively transmit to the UE, within a header of a packet carrying bearer data to the UE (or otherwise within such a packet), a directive for the UE to decrease the UE's MTU.

This process can be particularly useful in a scenario where the network entity operates as an intermediary through which packets carrying bearer data flow both to and from the UE. In that scenario, the network entity could detect the MTU problem with respect to packets that are flowing through the network entity en route from the WCD to one or more destination nodes, and, in response to detecting the MTU problem, the network entity could then provide the directive to the UE by adding the directive into a header of a packet that is flowing through the network entity en route to the UE.

Accordingly, in one respect, disclosed is a method for dynamically configuring the MTU of a UE, where the MTU defines a maximum packet size for packet transmission from the UE. In accordance with the disclosure, the method includes receiving at a network entity a plurality of packets transmitted from the UE, and detecting by the network entity that at least a non-zero predefined threshold number of the received packets (e.g., two or more) each exceed an MTU of the network entity. Further, the method includes, responsive to the detecting that at least the non-zero predefined threshold number of the received packets each exceed the MTU of the network entity, causing the UE to decrease the MTU of the UE so as to reduce maximum packet size for packet transmission from the UE, where causing the UE to decrease the MTU of the UE so as to reduce maximum packet size for packet transmission from the UE involves the network entity transmitting to the UE, within a header of a packet carrying bearer data to the UE, a directive for the UE to decrease the MTU of the UE.

In another respect, disclosed is a network entity configured to control MTU of a UE, where the MTU defines a maximum packet size for packet transmission from the UE. In accordance with the disclosure, the network entity includes at least one network communication interface through which the network entity is configured to receive packets and from which the network entity is configured to transmit the received packets to destinations, and the network entity has an MTU that defines a maximum packet size for packet transmission from the network entity. Further, the network entity includes a processing unit, non-transitory data storage, and program instructions stored in the data storage and executable by the processing unit to carry out various operations.

For instance, the operations could include (i) detecting that at least a non-zero predefined threshold quantity of packets that the network entity receives from the UE each exceed the MTU of the network entity and (ii) responsive to the detecting, causing the UE to decrease the MTU of the UE so as to reduce maximum packet size for packet transmission from the UE, where causing the UE to decrease the MTU of the UE so as to reduce maximum packet size for packet transmission from the UE comprises transmitting to the UE, within a header of a packet carrying bearer data to the UE, a directive for the UE to decrease the MTU of the UE.

In addition, in another respect, disclosed is a non-transitory computer readable medium having encoded thereon program instructions executable to cause a network entity to control MTU of a UE, where the MTU defines a maximum packet size for packet transmission from the UE. In particular, the instructions could be executable by a processing unit to cause the network entity to control MTU of the UE by (i) detecting that at least a non-zero threshold number of packets received by the network entity from the UE each exceed an MTU of the network entity and (ii) responsive to the detecting that at least the non-zero threshold number of packets received by the network entity from the UE each exceed an MTU of the network entity, causing the network entity to transmit to the UE, within a header of a packet carrying bearer data to the UE, a directive for the UE to decrease the MTU of the UE so as to reduce maximum packet size for packet transmission from the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
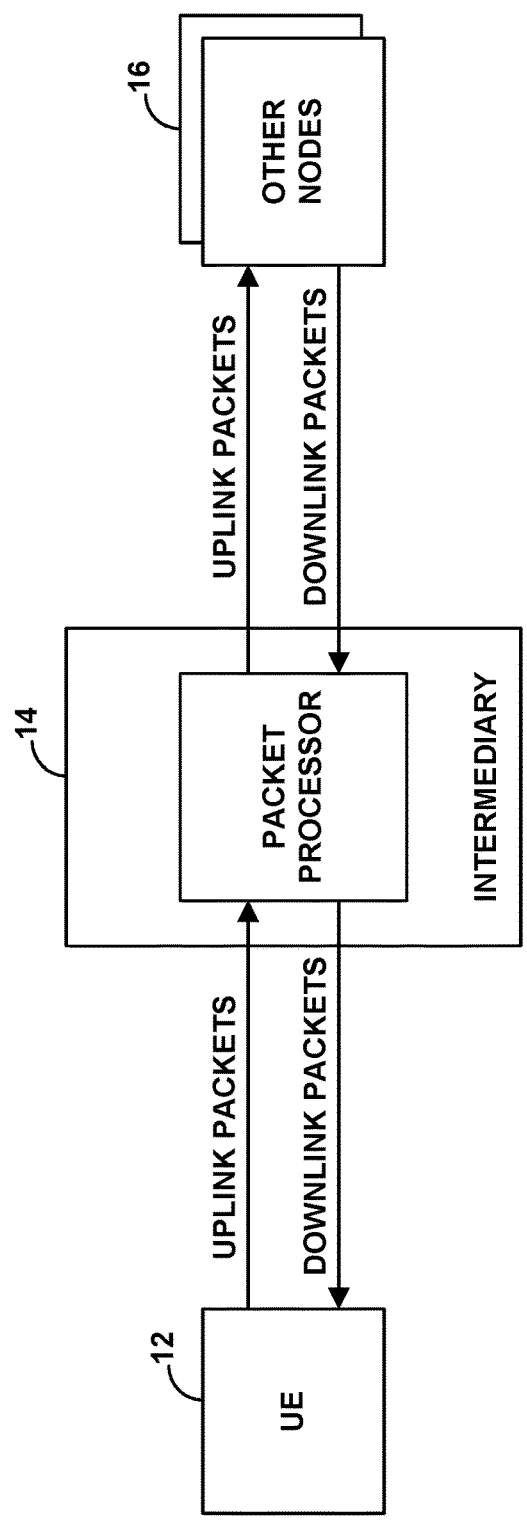
FIG. 1 is a simplified block diagram of an example network arrangement in which various disclosed features can be implemented.

Referring to the drawings, as noted above, FIG. 1 is a simplified block diagram depicting a network arrangement in which the presently disclosed features can be implemented. As shown, the network arrangement includes a representative UE 12 in communication with various other nodes 16 via an intermediary 14.

In particular, the figure shows uplink packets flowing from the UE 12 to the intermediary 14 and from the intermediary 14 to the other nodes 16, and downlink packets flowing from the other nodes 16 to the intermediary 14 and from the intermediary 14 to the UE 12. In practice, the UE could generate the uplink packets and transmit them to the other nodes, and those uplink packets could be routed through the intermediary on their way to the other nodes. And the other nodes could generate the downlink packets and transmit them to the UE, and those downlink packets could be routed through the intermediary on their way to the UE.

Each of these entities could take any of a variety of forms, configured to transmit and receive packets through wired and/or wireless interfaces. For instance, the UE could be a client or server device, such as a computer, a telephone, and/or an embedded communication module, configured to engage in packet data communication. The intermediary could be any entity through which packets would flow en route between the UE and the other nodes, such as base station, a router, a switch, a gateway, and/or a firewall. And other nodes could likewise be client or server devices, such as computers, telephones, and/or embedded communication modules. Numerous other examples are possible as well.

The connections between these entities could thus also take various forms, configured to support packet-data communications. For example, the intermediary could sit as a node on a core network operated by an Internet service provider, such as a cellular service provider or cable service provider, and the service provider could provide a wired or wireless access network or other means for connecting with the UE and providing the UE with access to engage in packet-data communications. The other nodes could then sit on the core network or be accessible via the core network.

Figure 2:
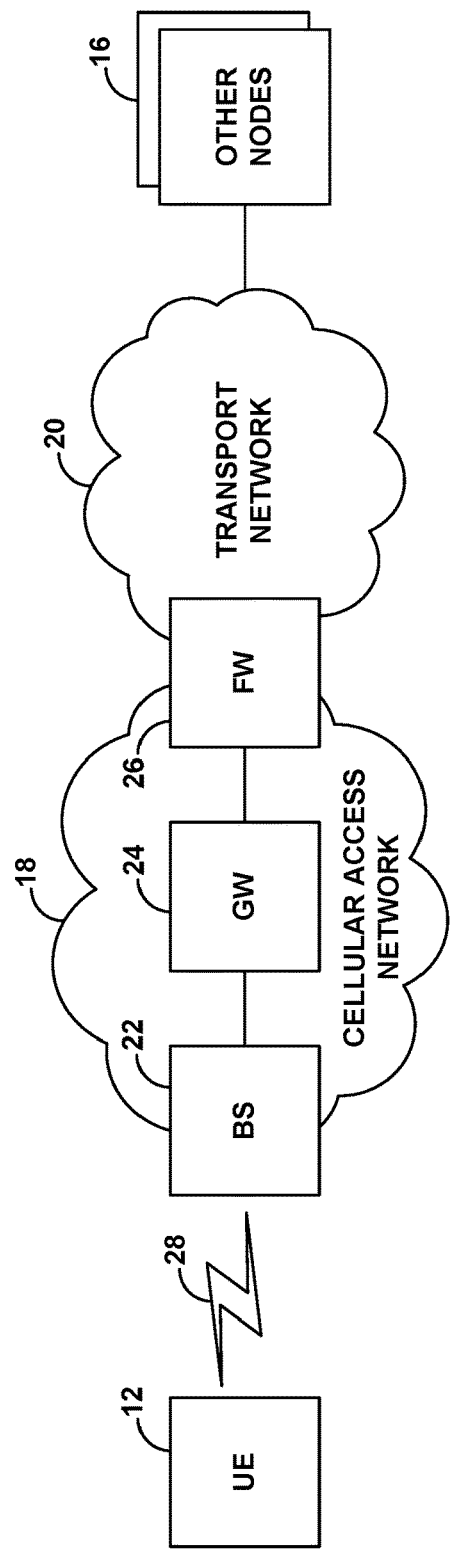
FIG. 2 is another simplified block diagram of an example network arrangement in which various disclosed features can be implemented.

FIG. 2 is a simplified block diagram depicting a more specific network arrangement in which the presently disclosed features can be implemented. In particular, FIG. 2 depicts an arrangement where the UE 12 is a cellular wireless device (such as a cell phone, tablet computer, tracking device, embedded wireless module, or other wirelessly-equipped communication device) served by a cellular access network 18 that provides connectivity with a transport network 20 such as the Internet.

In the example arrangement shown in FIG. 2, the cellular access network 18 includes a base station 22, a gateway 24, and a firewall 26, any of which could be examples of the intermediary presently contemplated.

The base station 22 could be any type of base station or wireless access point, such as a macro base station, a small cell base station, or a relay base station, and could include a wireless communication interface (comprising an antenna structure and associated transceiver) for providing a wireless coverage area 28 in which to serve UE 12 according to an agreed air interface protocol. Examples of such air interface protocols include Long Term Evolution (LTE), 5 G New Radio (5 G NR), Code Division Multiple Access (CDMA), Global System for Mobile Communication (GSM), WiFi, and others now known or later developed.

The base station 22 could then interface directly or directly with the gateway 24 (perhaps with one or more intervening gateways, routers, or the like). In turn, the gateway 24 could control network-address assignment and could provide connectivity with the transport network 20 via the firewall 26. And the firewall 26 could be a server configured to implement access control and/or other such services.

Each of these example entities in the cellular access network could include one or more physical interfaces through which the entity could transmit and receive packets. For instance, each entity could include a network communication interface such as an Ethernet interface through which the entity is configured to transmit and receive packets in the access network 18. Further, the base station 22 could use its wireless communication interface to exchange packets wirelessly with the UE 12, and the gateway and/or firewall could include a network communication interface through which to transmit and receive packets on the transport network 20.

Figure 3:
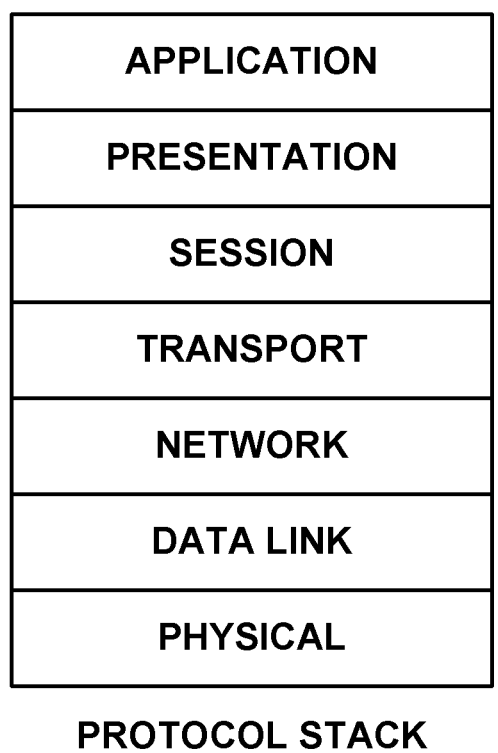
FIG. 3 is a depiction of an example communication protocol stack.

Any entity that engages in packet-data communication could further be programmed to implement a protocol stack defining logical layers though which the entity processes inbound and outbound communications. FIG. 3 depicts an example of such a protocol stack, ranging from an application layer down to a physical layer. In practice, an entity implementing this or another such stack could process outbound data sequentially from an upper layer down to the physical layer for external transmission, with each layer respectively operating on the data, such as by segmenting, encoding, and/or encapsulating the data in a layer-specific manner. Further, the entity could receive inbound data at the physical layer and could process the received data sequentially from the physical layer up to an upper layer up the stack, with each layer respectively operating on the data, such as by combining, decoding, and/or de-encapsulating the data in a layer-specific manner.

Representative layers in this stack include a transport layer, which could implement the Transmission Control Protocol (TCP) or the User Datagram Protocol (UDP), and a network layer, which could implement the Internet Protocol (IP).

For outbound data, at the transport layer, the entity could take a block of data (service data unit (SDU)) from the session layer and create a transport layer packet or datagram (protocol data unit (PDU)) that has a transport-layer header (e.g., designating source and destination transport ports) and contains the block of data as payload. In turn, at the network layer, the entity could then take that transport-layer packet (as an IP-layer SDU) and create an IP packet or datagram (as an IP-layer PDU) that has an IP header (e.g., designating source and destination IP addresses) and contains the transport-layer packet as payload. After further processing of the resulting IP packet at the data link layer and the physical layer, the entity could then output the result for external transmission.

For inbound data, on the other hand, when the entity has processed received data through its physical and data link layers to uncover an IP packet, the entity could strip the IP header from the packet at the network layer to uncover the underlying transport-layer packet, and the entity could then strip the transport layer from the transport-layer packet at the transport layer to uncover the underlying payload, which the entity could in turn process sequentially at one or more higher layers as appropriate.

In line with the discussion above, each of these entities could be configured (e.g., programmed) with an MTU, defining the maximum packet length for packet transmission from the entity. Thus, in the simplified arrangement shown, the UE 12 could be configured with an MTU defining a maximum packet length for each uplink packet that the UE would transmit, the intermediary 14 could be configured with an MTU defining a maximum packet length for each uplink packet and each downlink packet that the intermediary would transmit, and each other node could be configured with an MTU defining a maximum packet length for each downlink packet that the other node would transmit.

In practice, an entity's MTU could be defined with respect to a specific layer of the entity's protocol stack. For instance, the MTU could be defined at the IP layer and could govern the maximum size of an IP packet that the entity will output (e.g., that the entity will pass down the remainder of its protocol stack for ultimate external transmission). Or the MTU could be defined at the transport layer and could govern the maximum size of a transport-layer packet that the entity will output (e.g., that the entity will pass down the remainder of its protocol stack for ultimate external transmission).

Further, as noted above, the MTU could dictate a maximum size (e.g., length in bits or octets) of the packet as a whole, including its header and its payload, or could dictate the maximum size of the packet in terms of its payload alone. Example MTUs could be on the order of 1000-2000 octets; for example, a representative MTU might be 1500 octets.

The entity could be programmed with an indication of this MTU, perhaps as part of the entity's program logic defining its protocol stack. Thus, as the entity is processing or establishing an outbound packet, the entity could programmatically determine if the packet will comply with the entity's MTU. And if it would not, then the entity could engage in fragmentation as discussed above.

By way of example, if an entity establishes a transport-layer PDU (network-layer SDU) that is a certain size, the entity may determine that, when the entity adds a network-layer header of a predefined size so as to establish a network-layer PDU, the resulting network-layer PDU will be larger than the entity's network-layer MTU. Given this, at the transport-layer, the entity may responsively fragment the transport-layer PDU into two separate PDUs and then process each separately at the network layer to produce two separate network-layer PDUs that comply with the entity's network-layer MTU. Alternatively, at the network layer, the entity may responsively fragment the received network-layer SDU into two separate SDUs and then process each separately to likewise produce two separate network-layer PDUs that comply with the entity's network-layer MTU.

An entity such as the UE 12 might be configured to avoid this fragmentation issue altogether for its outbound packets by simply ensuring in the first place that each transport-layer PDUs (network-layer SDUs) that it generates will, when combined with a network-layer header, comply with the entity's network-layer MTU.

Processing in an intermediary such as the base station 22, gateway 24, or firewall 26, however, could be more complicated. When such an entity receives data representing an uplink packet that the entity is to forward, the entity may process the received data through its protocol stack up to its network and/or transport layer, and may then process the packet back down through its protocol stack for physical layer output (perhaps output on a different physical layer). In this process, if the entity determines that the resulting outbound packet is larger than the entity's MTU, the entity may engage in fragmentation of the packet before outputting it. Thus, though the entity may receive a single uplink packet for forwarding, if that packet violates the entity's MTU, then the entity may end up externally transmitting multiple uplink packets.

In the arrangement of FIG. 2, the problem presently addressed could arise if the UE 12 has an MTU that is larger than the MTU of an intermediary such as the base station 22, the gateway 24, or the firewall 26. As noted above, this might happen, for instance, if the UE and such an intermediary are made by different manufacturers, and/or perhaps because the UE is programmed with an MTU consistent with that used in one network, subnetwork, or region but the UE moves to another network, subnetwork, or region, where a smaller MTU is in use.

Per the present disclosure, as noted above, the intermediary in this situation can help resolve this issue by (i) detecting when each of a threshold number of packets that it has received from the UE exceeds the intermediary's MTU and (ii) then responsively adding to a bearer packet destined to the UE a directive that will cause the UE to decrease the UE's MTU.

This process is especially well-suited for application by an intermediary such as those shown in FIG. 2, because those intermediaries handle both uplink packets transmitted from the UE and downlink packets transmitted to the UE. Such an entity could thus detect issues with the UE's uplink packets exceeding the entity's MTU and could then conveniently transmit the MTU-reduction directive to the UE in a header of a downlink packet that is en route through the intermediary to the UE. As such, the process may avoid the need to use separate messaging, such as Internet Control Message Protocol (ICMP) messaging that the intermediary may in some or all situations not support in any event.

In a representative implementation of this process, the intermediary could programmatically keep track of how many uplink packets the intermediary has received directly or indirectly from the UE have each exceeded the entity's MTU. The intermediary could keep this record on a sliding-window time basis, such as over a most recent predetermined period of time, thus effectively defining a rate at which packets that the intermediary has received from the UE are exceeding the entity's MTU.

Further, the intermediary could be programmed to monitor the tracked count of such packets to determine when the count is threshold high. Determining when the count is threshold high could involve the intermediary comparing the count with a predefined threshold that has been deemed by programming or engineering design to be threshold high, to determine when the count meets that threshold or perhaps when the count is higher than that threshold. What value is used as the threshold may depend on what timeframe is used for the sliding window. By way of example and without limitation, the sliding window might be on the order of ten seconds to a minute, and the threshold might be on the order of three to ten packets. However, in any event, the threshold will be non-zero, and may preferably be at least two.

This predefined threshold might be set statically in advance by engineering input. Alternatively, the intermediary or another entity on its behalf may dynamically set the threshold based on one or more factors. For instance, the threshold could be dynamically reduced (to make the intermediary more sensitive and responsive to the problem) automatically at times when the intermediary is busier in terms of packet processing or other metrics (e.g., in response to detecting such a situation), as it may be beneficial in such a situation for the intermediary to more readily respond to the fragmentation problem.

Note that, in this process, the intermediary may or may not possess information that actually identifies which specific UE is the transmitter of these packets. However, the intermediary may have information that enables the intermediary to track the fact that it is the same UE in each instance and that enables the intermediary to transmit an MTU-reduction directive in a header of a packet en route to that same UE.

If the intermediary is the base station 22, for instance, the intermediary might identify the UE by a radio-link connection identifier for the intermediary's wireless service of the UE. The intermediary could thus track how many packets from a UE having that radio-link identifier exceed the intermediary's MTU, and, upon determining that that count is threshold high, the intermediary could then add the MTU-reduction directive into a header of a packet that is en route to the UE having that radio-link identifier.

If the intermediary is the gateway 24 or firewall 26, on the other hand, the intermediary might identify the UE by an IP address used by the UE. The intermediary could thus track how many uplink packets having that IP address as a source address exceed the intermediary's MTU, and, upon determining that that count is threshold high, the intermediary could then add the MTU-reduction directive into a header of a downlink packet that has that IP address as a destination address. Other examples are possible as well.

In any event, in response to detecting that the count problematic packets received from the UE (count of packets from the UE that exceed the intermediary's MTU) exceeds the predefined threshold, the intermediary could then transmit to the UE a directive that will cause the UE to respond by decreasing the UE's MTU, e.g., to be the same as or lower than the intermediary's MTU. In particular, as packets flowing both to and from the UE may flow through the intermediary, the intermediary could take advantage of the packets flowing to the UE to convey this directive to the UE, by providing the directive within a header of such a packet or otherwise within such a packet.

The directive that will cause the UE to decrease the UE's MTU could take the various forms. For instance, the directive could comprise a Boolean flag (e.g., a bit whose value commands the UE to decrement or increment the UE's MTU by a predefined amount known to the UE, such as with a value of zero being an MTU-decrement command and a value of one being an MTU-increment command). Alternatively or additionally, the directive could comprise a greater number of bits.

Further, the directive could specify an amount by which the UE should decrease the UE's MTU. For instance, the directive could include a value that indicates a number of bits by which the UE should decrease the UE's MTU, and/or the directive could include a value that indicates the MTU that the UE should use. Alternatively, the directive may not specify such values, and the UE could be programmed to respond to the directive by decreasing the UE's MTU by a predefined amount or to be a predefined MTU.

In addition, the directive could provide for the UE to decrease the UE's MTU temporarily, after which the UE would then revert to the MTU that it had before the decrease. For instance, the directive could specify a duration (e.g., on the order of minutes or hours) for which the UE should apply the decreased MTU. Alternatively, the UE could programmed to decrease its MTU temporarily in any event, such as to apply the decreased MTU only for as long as the UE's current connection remains active, or until the UE experiences another type of connection or operational change.

The intermediary could provide the directive to the UE within a header of a packet that is en route to the UE through the intermediary, such as a packet flowing from another node 16 to the UE. The payload of such as packet could contain bearer data, i.e., data for use by the UE, such as application-layer or user-plane data or the like. And the header could include a user-definable section or could otherwise support being supplemented or revised to include the directive presently contemplated. Further, the header could be an encapsulated header, such as a higher-layer header that is within the payload section of the packet. The intermediary could thus receive the packet, add the directive into the packet's header, and then output the packet for transmission to the UE. In this process, the packet is still considered to be received and forwarded, even though the intermediary modifies in the process it by adding the directive.

When the UE receives this downlink packet containing the directive from the intermediary, the UE could process the packet as the UE normally would, to handle the bearer data contained with the packet, but the UE could also respond to the directive by decreasing the UE's MTU. For instance, the UE could the received data containing the packet up through the UE's protocol stack, processing at each layer and ultimately uncovering the underlying bearer data, such as application data for processing and use by the UE's application layer. Further, at an appropriate layer of the UE's protocol stack (such as at the network layer), the UE could read the directive from the packet, and the UE could respond accordingly, in line with the discussion above.

Figure 4:
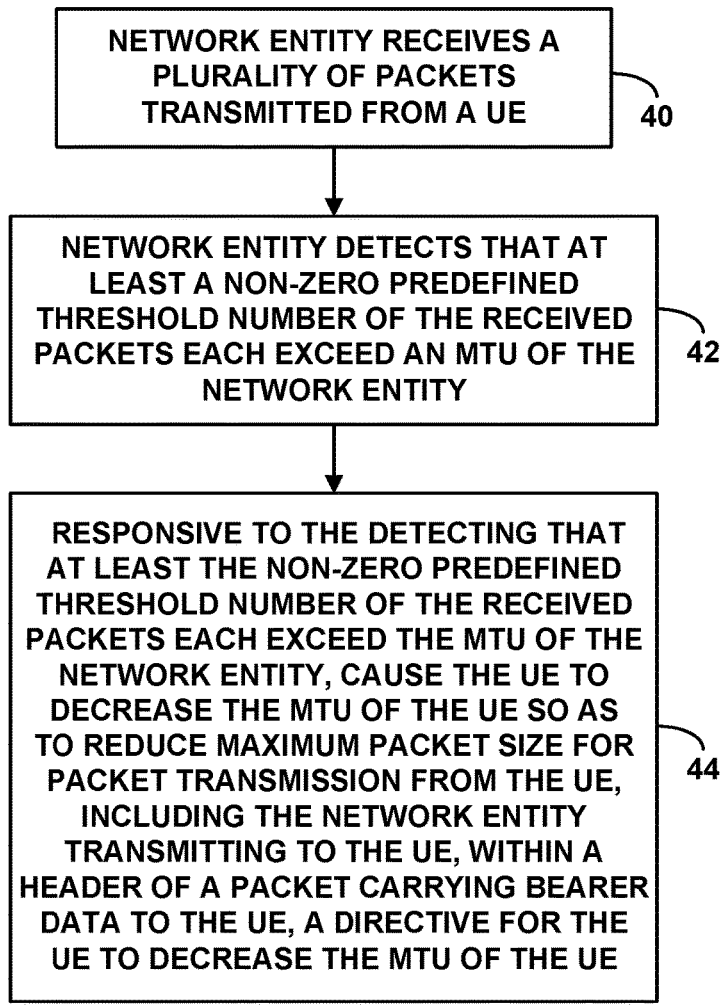
FIG. 4 is a flow chart depicting example operations that can be carried out by a network entity per the disclosure.

FIG. 4 is next a flow chart depicting an example method that can be carried out by a network entity in line with the discussion above, to dynamically configure MTU of a UE, where the MTU defines a maximum packet size for packet transmission from the UE.

As shown in FIG. 4, at block 40, the method includes the network entity receiving a plurality of packets transmitted from the UE (subject to possible modification by intervening routers or the like en route). At block 42, the method includes the network entity detecting that at least a non-zero predefined threshold number of the received packets each exceed an MTU of the network entity. And block 44, the method includes, responsive to the detecting that at least the non-zero predefined threshold number of the received packets each exceed the MTU of the network entity, causing the UE to decrease the MTU of the UE so as to reduce maximum packet size for packet transmission from the UE, where causing the UE to decrease the MTU of the UE so as to reduce maximum packet size for packet transmission from the UE comprises the network entity transmitting to the UE, within a header of a packet carrying bearer data to the UE, a directive for the UE to decrease the MTU of the UE.

As discussed above, the network entity in this method could comprises an intermediary through which packetized bearer data to and from the UE flows. For instance, the network entity could operate as at least one of a base station, a gateway, or a firewall (possibly operating as a combination of two or more of these or other entities). Further, the act of the network entity transmitting to the UE the directive within a header of a packet carrying bearer data to the UE could comprise the network entity adding the directive to a header of a packet that is en route to the UE via the network entity.

As further discussed above, the network entity could comprise an entity through which packets from the UE pass on their way to a destination (i.e., each packet to a respective destination), and the MTU of the network entity defines a maximum packet size for packet transmission from the network entity. In that arrangement, when the network entity receives from the UE a packet that is bigger than the maximum packet size for packet transmission from the network entity, the network entity fragments the packet to produce multiple packets and transmits the multiple packets along to the destination.

In practice, the act of the network entity detecting that at least the non-zero predefined threshold number of the received packets each exceed an MTU of the network entity could involve, for at least each packet of the number of received packets, (i) the network entity determining a size of the packet and comparing the determined size with the MTU of the network entity, and (ii) the network entity determining, based on the comparing, that the packet is larger than the MTU of the network entity.

In addition, as discussed above, the act of causing the UE to decrease the MTU of the UE could comprises causing the UE to decrease the MTU of the UE temporarily, such as for a specified or predefined time period. Further, the MTU of the UE could define a maximum datagram size for IP packet transmission from the UE (e.g., maximum size of IP-layer PDU output by the UE for processing by the UE's lower protocol-stack layers), and the MTU of the network entity could likewise define a maximum datagram size for IP packet transmission from the network entity.

Figure 5:
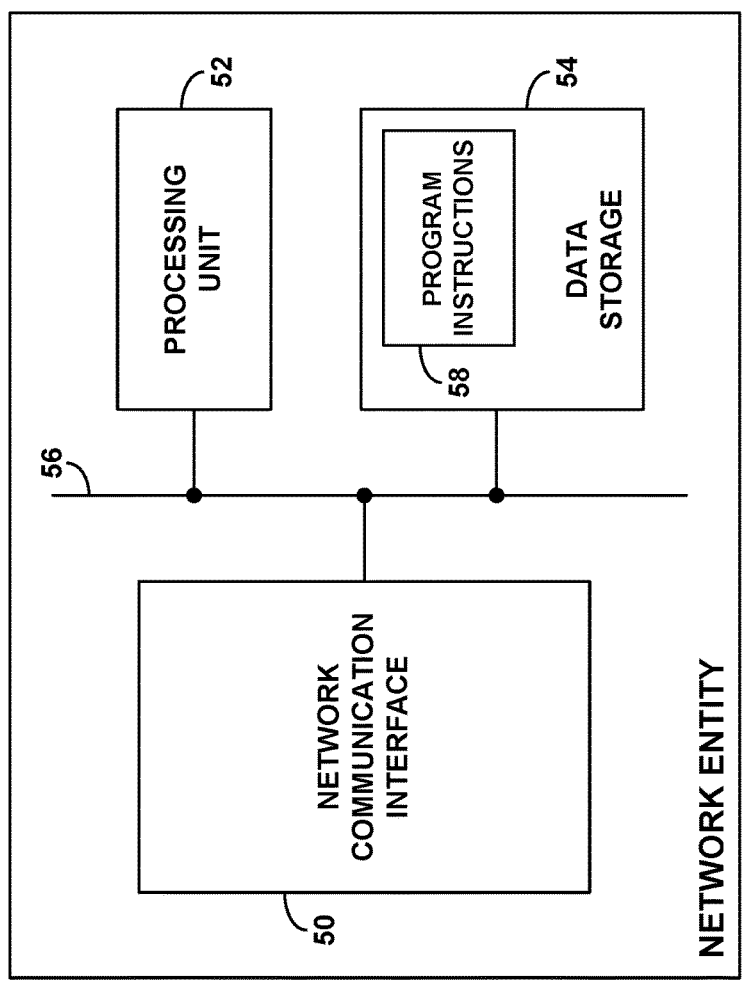
FIG. 5 is a simplified block diagram of an example network entity operable in accordance with the disclosure.

FIG. 5 is next a simplified block diagram of a network entity, showing some of the components that can be included in such an entity to facilitate operation in accordance with the discussion above. As shown in FIG. 5, the entity includes a network communication interface 50, a processing unit 52, and non-transitory data storage 54, all of which could be integrated in various ways or communicatively linked together by a system bus or other connection mechanism 56.

The network communication interface 50 could comprise one or more physical interfaces and associated processing systems to implement protocol stack processing, enabling the network entity to receive packets en route from a source to a destination and to transmit those packets (modified if appropriate) to their destinations. In some implementations, the network communication interface 50 could be a single network interface circuit. In other implementations, the network communication interface 50 could include separate network interfaces. For instance, if the network entity is base station 22, the network communication interface 50 could include a wireless communication interface for engaging in air interface communication with UE 12 and could separately include a backhaul communication interface for engaging in communication within the access network 18, such as with one or more gateways, controllers, and the like.

The processing unit 52 could then comprise one or more general purpose processors (e.g., microprocessors) and/or one or more special purpose processors (e.g., digital signal processors, application specific integrated circuits, etc.) and could be provided as part of the network communication interface 50. And the non-transitory data storage 54 could comprise one or more volatile and/or non-volatile storage components, such as magnetic, optical, flash, and random access memory storage. As shown, the non-transitory data storage 54 could hold (e.g., have encoded thereon) program instructions 58 executable by the processing unit 52 to carry out various operations (including causing the network entity to carry out various operations) as discussed above.

Thus, in line with the discussion above, the network entity could have an MTU that defines a maximum packet size for packet transmission from the network entity. And the operations could include (i) detecting that at least a non-zero predefined threshold quantity of packets that the network entity receives from the UE each exceed the MTU of the network entity and (ii) responsive to the detecting that at least the non-zero predefined threshold quantity of the packets received from the UE each exceed the MTU of the network entity, causing the UE to decrease the MTU of the UE so as to reduce maximum packet size for packet transmission from the UE. And as discussed above, causing the UE to decrease the MTU of the UE so as to reduce maximum packet size for packet transmission from the UE could comprise transmitting to the UE, within a header of a packet carrying bearer data to the UE, a directive for the UE to decrease the MTU of the UE.

Various features discussed above can be applied in this context, and vice versa.

Exemplary embodiments have been described above. Those skilled in the art will understand, however, that changes and modifications may be made to these embodiments without departing from the true scope and spirit of the invention.

We claim:

1. A method for dynamically configuring a maximum transmission unit (MTU) of a user equipment device (UE), wherein the MTU defines a maximum packet size for packet transmission from the UE, the method comprising:

receiving at a network entity a plurality of packets transmitted from the UE;

detecting by the network entity that at least a non-zero predefined threshold number of the received packets each exceed an MTU of the network entity; and responsive to the detecting that at least the non-zero predefined threshold number of the received packets each exceed the MTU of the network entity, causing the UE to decrease the MTU of the UE so as to reduce maximum packet size for packet transmission from the UE, wherein causing the UE to decrease the MTU of the UE so as to reduce maximum packet size for packet transmission from the UE comprises the network entity transmitting to the UE, within a header of a packet carrying bearer data to the UE, a directive for the UE to decrease the MTU of the UE.

2. The method of claim 1, wherein the network entity comprises an intermediary through which packetized bearer data to and from the UE flows.

3. The method of claim 2, wherein the network entity operates as at least one of a base station, a gateway, or a firewall.

4. The method of claim 2, wherein the network entity transmitting to the UE the directive within a header of a packet carrying bearer data to the UE comprises the network entity adding the directive to a header of a packet that is en route to the UE via the network entity.

5. The method of claim 1, wherein the network entity comprises an entity through which packets from the UE pass on their way to a destination, wherein the MTU of the network entity defines a maximum packet size for packet transmission from the network entity, whereby, when the network entity receives from the UE a packet that is bigger than the maximum packet size for packet transmission from the network entity, the network entity fragments the packet to produce multiple packets and transmits the multiple packets along to the destination.

6. The method of claim 1, wherein detecting by the network entity that at least a non-zero predefined threshold number of the received packets each exceed an MTU of the network entity comprises:

for at least each packet of the number of received packets, (i) determining by the network entity a size of the packet and comparing by the network entity the determined size with the MTU of the network entity, and (ii) determining by the network entity, based on the comparing, that the packet is larger than the MTU of the network entity.

7. The method of claim 1, wherein causing the UE to decrease the MTU of the UE comprises causing the UE to decrease the MTU of the UE temporarily.

8. The method of claim 1, wherein the MTU of the UE defines a maximum datagram size for Internet Protocol (IP) packet transmission from the UE, and wherein the MTU of the network entity defines a maximum datagram size for IP packet transmission from the network entity.

9. A network entity configured to control maximum transmission unit (MTU) of a user equipment device (UE), wherein the MTU defines a maximum packet size for packet transmission from the UE, the network entity comprising:

at least one network communication interface through which the network entity is configured to receive packets and from which the network entity is configured to transmit the received packets to destinations, wherein the network entity has an MTU that defines a maximum packet size for packet transmission from the network entity;

a processing unit;

non-transitory data storage; and program instructions stored in the non-transitory data storage and executable by the processing unit to (i) detect that at least a non-zero predefined threshold quantity of packets that the network entity receives from the UE each exceed the MTU of the network entity and (ii) responsive to the detecting that at least the non-zero predefined threshold quantity of the packets received from the UE each exceed the MTU of the network entity, cause the UE to decrease the MTU of the UE so as to reduce maximum packet size for packet transmission from the UE, wherein causing the UE to decrease the MTU of the UE so as to reduce maximum packet size for packet transmission from the UE comprises transmitting to the UE, within a header of a packet carrying bearer data to the UE, a directive for the UE to decrease the MTU of the UE.

10. The network entity of claim 9, wherein the network entity is configured to operate as an intermediary through which packetized bearer data to and from the UE flows.

11. The network entity of claim 10, wherein the network entity operates as at least one of a base station, a gateway, or a firewall.

12. The network entity of claim 11, wherein transmitting to the UE the directive within a header of a packet carrying bearer data to the UE comprises adding the directive to a header of a packet that is en route to the UE via the network entity.

13. The network entity of claim 9, wherein the network entity is configured to operate as an intermediary through which packets from the UE pass on their way to a destination, wherein the MTU of the network entity defines a maximum packet size for packet transmission from the network entity, wherein the network entity is further configured such that when the network entity receives from the UE a packet that is bigger than the maximum packet size for packet transmission from the network entity, the network entity fragments the packet to produce multiple packets and transmits the multiple packets along to the destination.

14. The method of claim 13, wherein the network entity operates as at least one of a base station, a gateway, or a firewall.

15. The network entity of claim 9, wherein causing the UE to decrease the MTU of the UE comprises causing the UE to decrease the MTU of the UE temporarily.

16. The network entity of claim 9, wherein the MTU of the UE defines a maximum datagram size for Internet Protocol (IP) packet transmission from the UE, and wherein the MTU of the network entity defines a maximum datagram size for IP packet transmission from the network entity.

17. A non-transitory computer readable medium having encoded thereon program instructions executable to cause a network entity to control maximum transmission unit (MTU) of a user equipment device (UE), wherein the MTU defines a maximum packet size for packet transmission from the UE, wherein causing the network entity to control the MTU of the UE comprises (i) detecting that at least a non-zero threshold number of packets received by the network entity from the UE each exceed an MTU of the network entity and (ii) responsive to the detecting that at least the non-zero threshold number of packets received by the network entity from the UE each exceed an MTU of the network entity, causing the network entity to transmit to the UE, within a packet carrying bearer data to the UE, a directive for the UE to decrease the MTU of the UE so as to reduce maximum packet size for packet transmission from the UE.

18. The non-transitory computer readable medium of claim 17, wherein the network entity operates as an intermediary through which packets en route to the UE flow, wherein the packet carrying bearer data to the UE is one such packet destined to the UE, and wherein causing the network entity to transmit to the UE the directive within the packet comprises causing the network entity to add the directive to a header of the packet.

19. The non-transitory computer readable medium of claim 17, wherein the network entity comprises an entity through which packets from the UE pass on their way to a destination, wherein the MTU of the network entity defines a maximum packet size for packet transmission from the network entity.

20. The non-transitory computer readable medium of claim 19, wherein the directive to the UE causes the UE to decrease the MTU of the UE temporarily.

* * * * *